United States Patent [19]

Saurer et al.

[11] 4,118,110
[45] Oct. 3, 1978

[54] PASSIVE ELECTRO-OPTIC DISPLAY CELL AND METHOD FOR MANUFACTURING IT

[75] Inventors: Eric Saurer, Bevaix; Claude Laesser, La Chaux-de-Fonds, both of Switzerland

[73] Assignee: Ebauches S.A., Switzerland

[21] Appl. No.: 765,954

[22] Filed: Feb. 7, 1977

[30] Foreign Application Priority Data

Feb. 25, 1976 [CH] Switzerland .................. 2312/76

[51] Int. Cl.² .............................................. G02F 1/13
[52] U.S. Cl. .................................... 350/334; 350/345
[58] Field of Search ............ 350/160 LC, 160 R, 150, 350/267, 334, 345

[56] References Cited

U.S. PATENT DOCUMENTS

| | | | |
|---|---|---|---|
| 3,712,047 | 1/1973 | Girard | 350/160 LC X |
| 3,751,137 | 8/1973 | Fitzgibbons et al. | 350/160 LC |
| 3,768,887 | 10/1973 | Portmann | 350/160 LC |
| 3,771,855 | 11/1973 | Burns | 350/160 LC |
| 3,864,905 | 2/1975 | Richardson | 350/160 LC X |
| 3,869,195 | 3/1975 | Aldrich et al. | 350/160 LC |
| 3,926,502 | 12/1975 | Tanaka et al. | 350/160 LC |
| 3,960,534 | 6/1976 | Oates | 350/160 LC X |
| 4,017,155 | 4/1977 | Yogi et al. | 350/160 LC |

OTHER PUBLICATIONS

Bush et al., "Liquid Crystal Display Device", *IBM Technical Disclosure Bulletin*, vol. 14, p. 223, Jun., 1971.

*Primary Examiner*—Edward S. Bauer
*Attorney, Agent, or Firm*—Silverman, Cass & Singer, Ltd.

[57] ABSTRACT

An electro-optic display cell including oppositely-facing transparent plates forming the inner surface of a compartment containing an incandescent lamp for illumination of the cell. The compartment is completely enclosed and itself forms the enclosure for the lamp.

10 Claims, 3 Drawing Figures

PASSIVE ELECTRO-OPTIC DISPLAY CELL AND METHOD FOR MANUFACTURING IT

BACKGROUND OF THE INVENTION

The present invention relates to a passive electro-optic display cell comprising two transparent plates on the inner faces of which are disposed electrodes maintained at a distance from one another, between which is located an active component.

The invention has also for an object a method for manufacturing a preferred embodiment of said cell in which the two plates carrying the electrodes are maintained at a distance one from another by a frame comprising a distance piece.

The lighting of passive electro-optic display cells, necessary in some applications of these cells, especially when they are used in watch-making, gives raise to difficulties. It has been suggested to use for this purpose incandescent lamps which have the advantage of being relatively inexpensive, but which have the drawback of being cumbersome, thus making them unusable for wristwatches, for instance. The miniaturisation of such lamps has the drawback of being very expensive.

The object of the present invention is to provide a simple and inexpensive means, not cumbersome, enabling illumination of such passive electro-optic display cells.

SUMMARY OF THE INVENTION

The display cell according to the invention is characterized by the fact that at least a portion of the surface of at least one of the transparent plates comprises the inner surface of a compartment containing a source of light for illumination of the cell.

The method for manufacturing a preferred embodiment of said cell, according to the invention, is characterized by the fact that one realises the electrodes on one face of each of two plates of glass, realises on one of the said plates a frame by serigraphy, this frame presenting an intermediary transversal member limiting two compartments, sinters the said frame, applies on the said frame the second plate which is assembled thereto by heating, produces a vacuum in the two compartments thus realised between the two plates, closes the compartment containing the source of light and fills the compartment containing the electrodes with an active component.

BRIEF DESCRIPTION OF THE DRAWINGS

The drawing shows, by way of example, one embodiment of the object of the invention and a modified form thereof.

DESCRIPTION OF THE PREFERRED EMBODIMENTS

Figure 1:
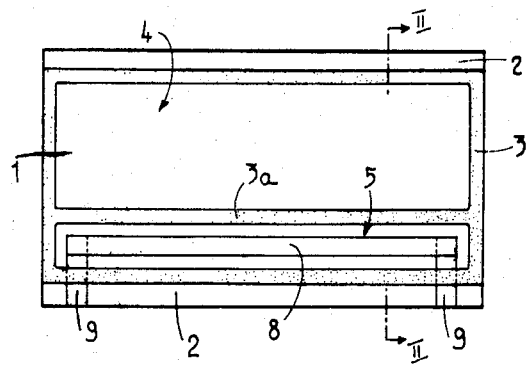
FIG. 1 is a plan view of a passive electro-optic display cell.
Figure 2:
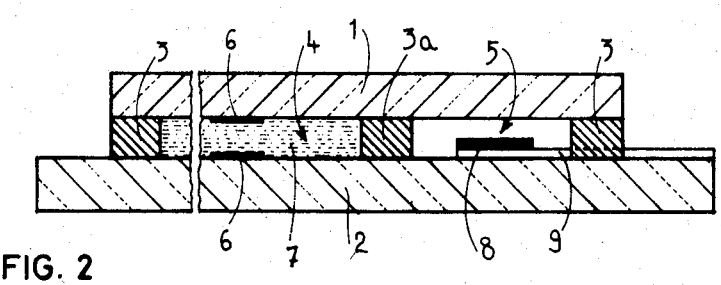
FIG. 2 is a sectional view of said cell, on a larger scale, along line II—II of FIG. 1.

The display cell represented in FIGS. 1 and 2 comprises two plates of transparent glass, there being a front plate 1, and a rear plate 2. The two plates 1 and 2, are superposed and maintained at a distance one from another by a frame 3. Frame 3 thereby is a distance piece and is constructed by sintering according to the technique called "glass frit". The frame 3 is provided with an intermediary transversal member 3a which divides in two juxtaposed compartments 4 and 5 the space comprised between the two plates 1 and 2.

Electrodes 6 are deposited on the inner faces of plates 1 and 2, in the area of said plates situated in the compartment 4. The compartment 4 is filled by an active component 7 which may be, for example, nematic liquid crystal working in dynamic diffusion.

A tungsten filament 5 is positioned in compartment 5; the ends of the filament are in contact with two tracks of copper 9, deposited on the plate 2, and which comprise conductors feeding the tungsten filament 8. The dimensions of the two tracks 9 are determined so that they can feed the filament 8 without heating. A vacuum will be created in the compartment 5 which could also be filled with an inert gas.

The compartment 5, the filament 8 and the feeding tracks 9 thus constitute an incandescent lamp which is a source of light to enable illumination of the cell.

The above described arrangement is advantageous in that the lighting device increases the dimensions of the cell to a very small degree. Moreover, as it will appear from the disclosure of the method of manufacture of the cell which follows, the structure of the lighting device is integrated with the method of manufacture of the cell itself, so that the cost of the lighting device per se is very low.

The method of manufacturing the cell as disclosed and represented is accomplished by depositing first a coating of conductive material, $In_2O_3$ for instance, on one of the faces of each of the plates of glass 1 and 2. Thereafter the excess of the conductive material is removed so as to expose the electrodes 6 from the conductive material. Removal of the conductive materials is accomplished by photo-chimic methods which are known per se.

A copper coating next is deposited on the rear plate 2. The pattern of the copper coating corresponds to one of the two tracks 9 and of the filament 8. A coating of tungsten is then deposited on the main portion of the copper coating, between the end portions intented to constitute the conductive tracks 9, so as to reach the edge of the rear plate 2. The portion of the copper which is located under the coating of tungsten is then treated with an acid so that said portion of the copper is separated from the plate 2, at a distance from the rear plate corresponding to the thickness of the initial coating of copper.

The frame 3 next is deposited serigraphically on one of the plates 1 and 2. Thereafter, the frame is sintered by thermic treatment and assembling of the second plate is effected by heating. A vacuum next is created between the two compartments 4 and 5 through openings provided therefor in the frame 3 at the time the frame 3 is deposited serigraphically. The compartment 5 containing the lighting device is then closed. Before proceeding with closing of the compartment, the same could be filled with an inert gas.

The cell then is placed on a sheet of liquid crystal so that the area surrounding the filling opening of the compartment 4 is fully in contact therewith. The pressure then is reestablished, so that the vacuum inside the compartment produces, by aspiration, the filling of the compartment 4 with the said liquid crystal. The filling opening is then closed by liquefaction of a patch of glass placed at the entrance of the opening, by means of a pulse of a laser.

Figure 3:
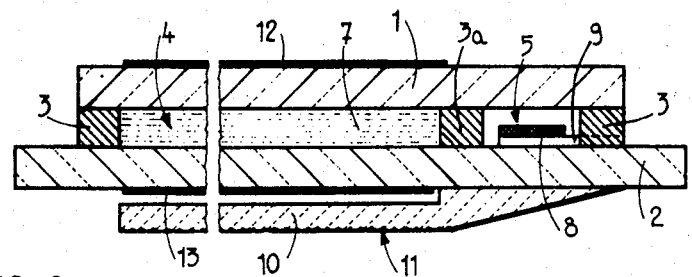
FIG. 3 is an elevational view of a modified form of of a passive electro-optic display cell.

The alternate embodiment of FIG. 3 is distinguishable from the first embodiment by the fact that the cell comprises, positioned behind the rear plate 2, a frosted glass diffusing member 10 which comprises a guide of light. A metallic coating 11, of aluminium or of silver for example, is deposited on the rear face of the member 10 and serves as a reflecting surface. It is here matter of a field effect cell the two polarizers of which have been represented at 12 and 13, respectively.

The presence of the diffuser 10 and of the mirror 11 causes the light produced by the filament of tungsten 8 to be guided so as to be evenly distributed behind the whole cell, and then reflected through the two plates 1 and 2 in the direction of the observer.

This embodiment of FIG. 3 has the advantage, with respect to the embodiment of FIGS. 1 and 2, of distributing the light more homogeneously so that it will be especially useful in the case of watches having a display effected by means of field effect liquid crystals. In this latter case, lighting by transparence has a higher efficiency than by natural lighting.

What we claim is:

1. An electro-optic display cell comprising, a pair of transparent plates maintained in facing relationship at a distance one with respect to the other, electrodes deposited on the inner-facing faces of said plates, a display medium located between said electrodes, at least a portion of the inner-facing surface of at least one said plate forming the inner surface of a tightly sealed completely enclosed first compartment, an incandescent lamp contained within the first compartment for providing illumination to the cell, the completely enclosed first compartment forming the enclosure of said lamp.

2. A display cell as claimed in claim 1 in which the two plates carrying the electrodes are maintained at a distance one from the other by a frame including a plate spacer, said frame defining between said plates the first compartment and a second compartment juxtaposed with the first compartment, said electrodes and said display medium being located in said second compartment.

3. A display cell as claimed in claim 1 in which there is a front plate and a rear plate, a reflecting and diffusing member positioned behind the rear plate, said reflecting and diffusing member serving to guide the light and distribute and reflect the same on the surface of the cell so that the light passes through the two plates in the direction of an observer.

4. A display cell as claimed in claim 1 in which said lamp includes a metallic filament positioned in said first compartment.

5. A display cell as claimed in claim 4 in which said metallic filament is a tungsten filament.

6. A display cell as claimed in claim 1 in which the first compartment is under vacuum.

7. A display cell as claimed in claim 1 in which the first compartment is filled with an inert gas.

8. Method for manufacturing an electro-optic display cell which includes a pair of transparent plates maintained in facing relationship at a distance one with respect to the other and an incandescent lamp for providing illumination to the cell, said method comprising the steps of: depositing electrodes on the inner-facing faces of the plates, forming serigraphically a frame on one of said plates, the frame including an intermediary member for defining a first and a second compartment between the plates of said cell, sintering the frame, applying the second plate on said frame by heating, providing a vacuum in said compartments, closing the first compartment to form the enclosure of the lamp, and filling the second compartment which includes the electrodes with a display medium.

9. Method as claimed in claim 8 including the step of filling the first compartment with an inert gas before closing said compartment.

10. Method as claimed in claim 8 including the following steps before the step of forming the frame: depositing a coating of conductive metal on one of said plates in the area thereof to be a part of the first compartment, the coating including a main portion occupying the first compartment and two end portions connecting the main portion to an edge of said one plate, depositing a coating of tungsten on said main portion of the conductive metal, destroying the initial metallic coating of said main portion so that the coating of tungsten is then separated from the plate but is maintained at its ends by the end portions of the initial metallic coating, whereby the coating of tungsten forms the filament of said lamp.

* * * * *